(12) United States Patent
Ronsheim

(10) Patent No.: US 6,641,323 B2
(45) Date of Patent: Nov. 4, 2003

(54) SPHERICAL LOCKING DEVICE

(76) Inventor: Stephen E. Ronsheim, 3475 Carr Hill Rd., Columbus, IN (US) 47201

( * ) Notice: Subject to any disclaimer, the term of this patent is extended or adjusted under 35 U.S.C. 154(b) by 17 days.

(21) Appl. No.: 10/054,046

(22) Filed: Jan. 22, 2002

(65) Prior Publication Data

US 2003/0138288 A1 Jul. 24, 2003

(51) Int. Cl.$^7$ ................................................ F16C 11/06
(52) U.S. Cl. .............................. 403/90; 403/31; 403/34; 403/39; 403/122; 269/75; 269/25
(58) Field of Search ..................... 248/288.31, 288.51, 248/481, 181.1; 269/75, 20, 25; 403/31, 34–39, 120, 122, 135–138, 190

(56) References Cited

U.S. PATENT DOCUMENTS

| 2,559,925 | A | * | 7/1951 | Barker | 269/75 |
| 3,737,130 | A | * | 6/1973 | Shiraishi | 248/181.1 |
| 5,280,892 | A | * | 1/1994 | Smith | 269/75 |
| 5,314,174 | A | * | 5/1994 | Hagman | 269/75 |
| 5,738,344 | A | * | 4/1998 | Hagman | 269/75 |

* cited by examiner

Primary Examiner—Lynne H. Browne
Assistant Examiner—Michael P. Ferguson
(74) Attorney, Agent, or Firm—Woodard, Emhardt, Moriarty, McNett & Henry LLP

(57) ABSTRACT

A cylindrical body has a first part-spherical socket portion in the top, fittingly receiving a ball. A ball retainer has a second part-spherical socket portion facing the first part-spherical socket portion and receiving the ball therein. A post has a proximal end fixed to the ball and extends radially outward from the ball and away from the body to a distal end, and has screw threads at the distal end to receive a fastener thereon for attachment of an object to the distal end of the post. The ball-in-socket mounting of the post enables freely swiveling the ball and thereby the swiveling the distal end of the post to an infinite number of loci in a spherical envelope centered at the center of the ball, as well as enabling the post, and any object mounted to the post, to be rotated on a radial line from the center of the ball to the location of mounting of the object to the post. The body has a hydraulic cylinder in the bottom receiving a piston. The piston is connected to the ball retainer for clamping the retainer on the ball and thereby locking the ball in the socket portions, to lock the post and thereby the object mounted to the post, in a position and orientation in space as selected by the user. A hydraulic pump assembly is coupled to the body to apply and release pressure on the piston.

11 Claims, 7 Drawing Sheets

SPHERICAL LOCKING DEVICE

BACKGROUND OF THE INVENTION

1. Field of the Invention

This invention relates generally to holding devices for objects, and more particularly to a device for holding a workpiece or other object, or for holding another workpiece holding device in any of a variety of positions and orientations for as long as desired.

2. Description of the Prior Art

In many industries, professions, and crafts, it is essential to hold an object stationary in some selected position and orientation in space for viewing it, for viewing with it, or working on it, or somehow dealing with it. Clamps and vises are probably the most common holding devices for such purposes. But in many instances, they are not versatile enough to easily hold an object in exactly the attitude or orientation which the user needs or desires. The present invention is addressed to this problem.

SUMMARY OF THE INVENTION

Described briefly, according to a typical embodiment of the present invention an object holding device includes a body having a first part-spherical socket portion fittingly receiving a ball. A ball clamp has a second part-spherical socket portion engaging the ball. An object mount on the ball extends in a direction away from the socket portions and from the body and has means thereon for attachment of an object to the ball.

The body has a cylinder therein receiving a piston forming a chamber in the body. The piston is connected to the clamp in such a way that when pressurized fluid is applied to the chamber, the piston moves the clamp socket portion tight against the ball, locking the ball in place. Prior to application of locking pressure, an object fastened to the post can be moved by the user to a variety of locations and orientations in space and then, upon selecting a desired location and orientation for the object, the user locks the object in the selected position and orientation by application of fluid pressure to the chamber.

DESCRIPTION OF THE ILLUSTRATED EMBODIMENT

Figure 1:
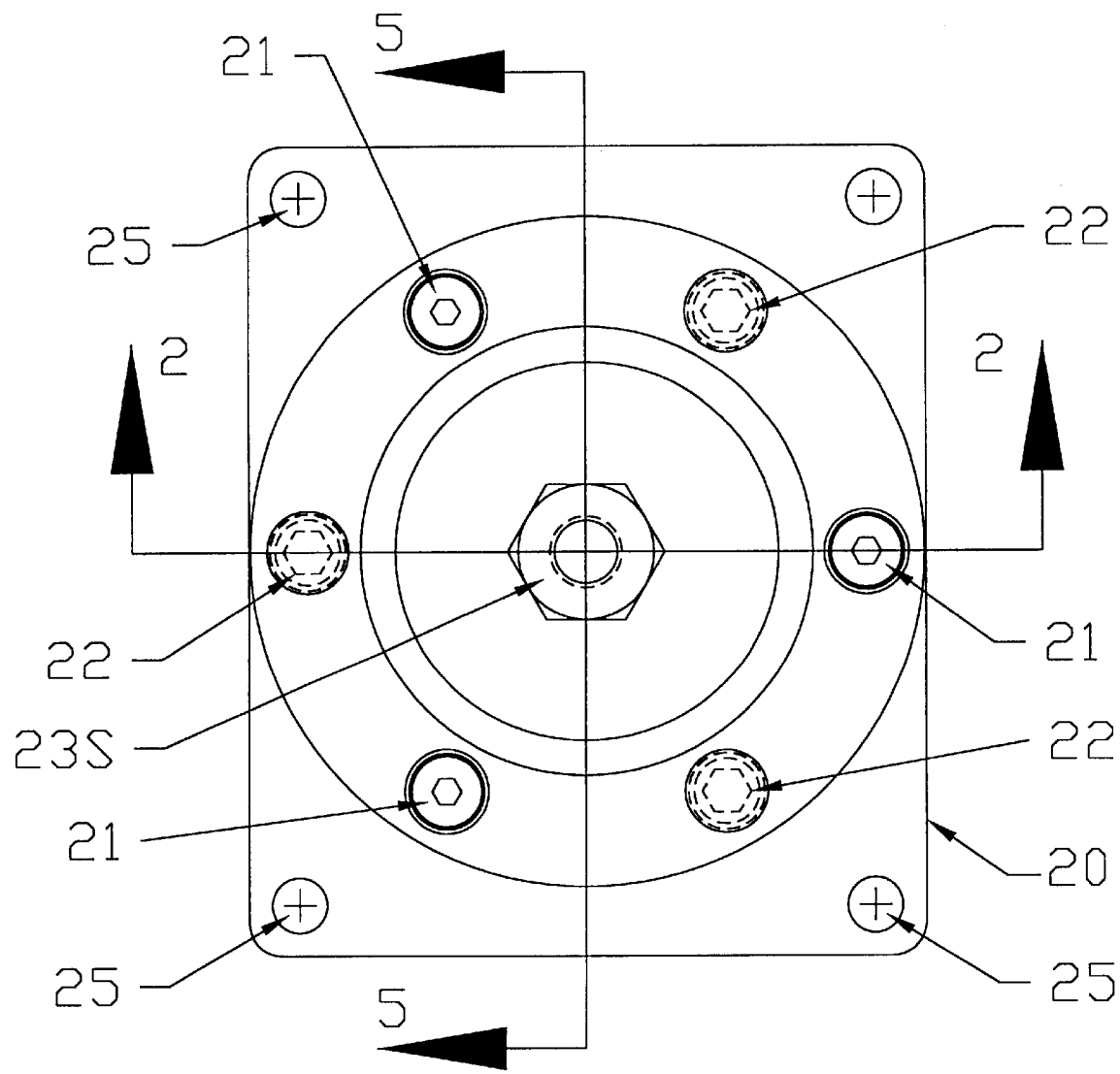
FIG. 1 is a top plan view of the device according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates are intended to be protected.

Figure 4:
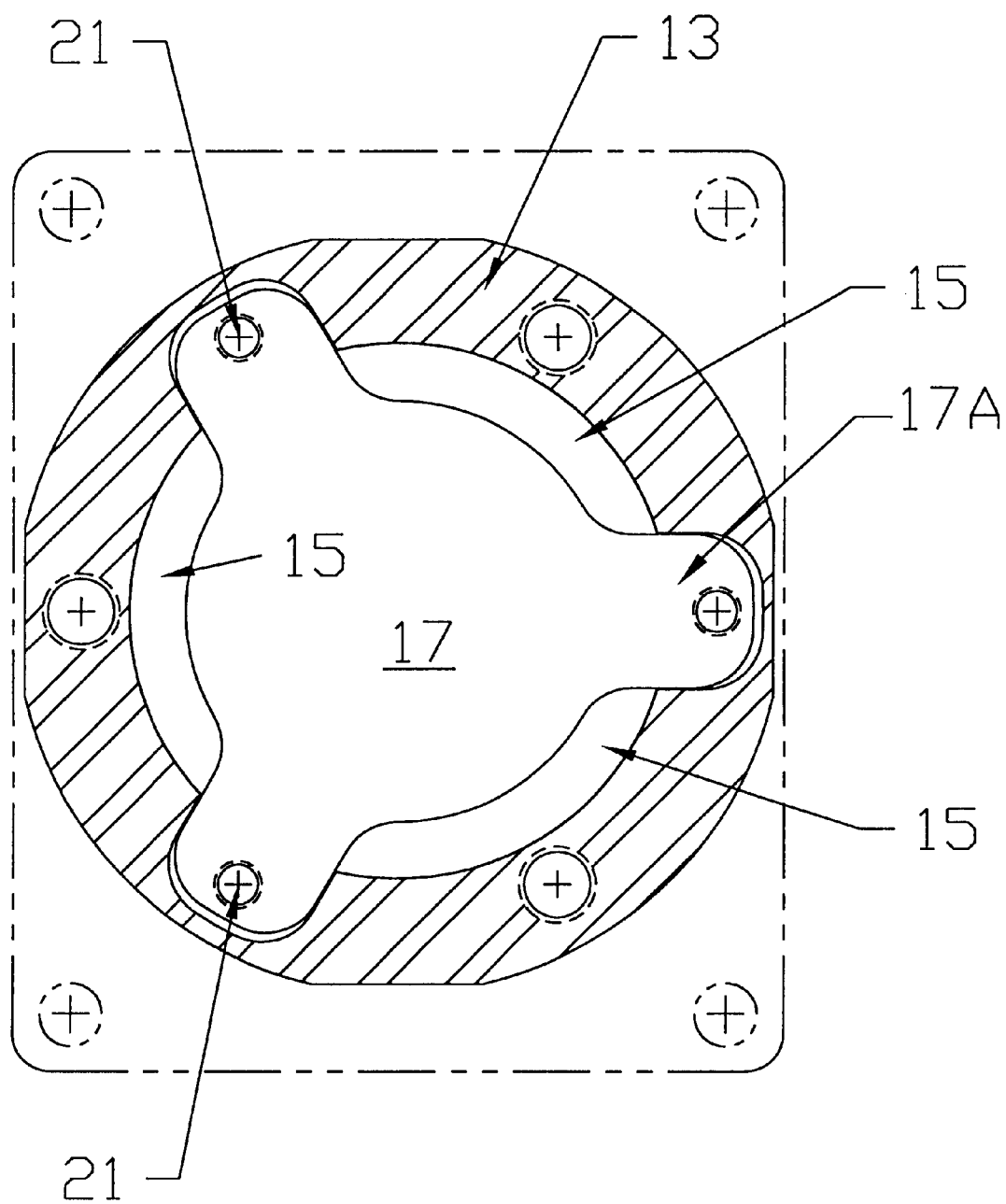
FIG. 4 is a section taken at line 4—4 in FIG. 2 and viewed in the direction of the arrows.
Figure 5:
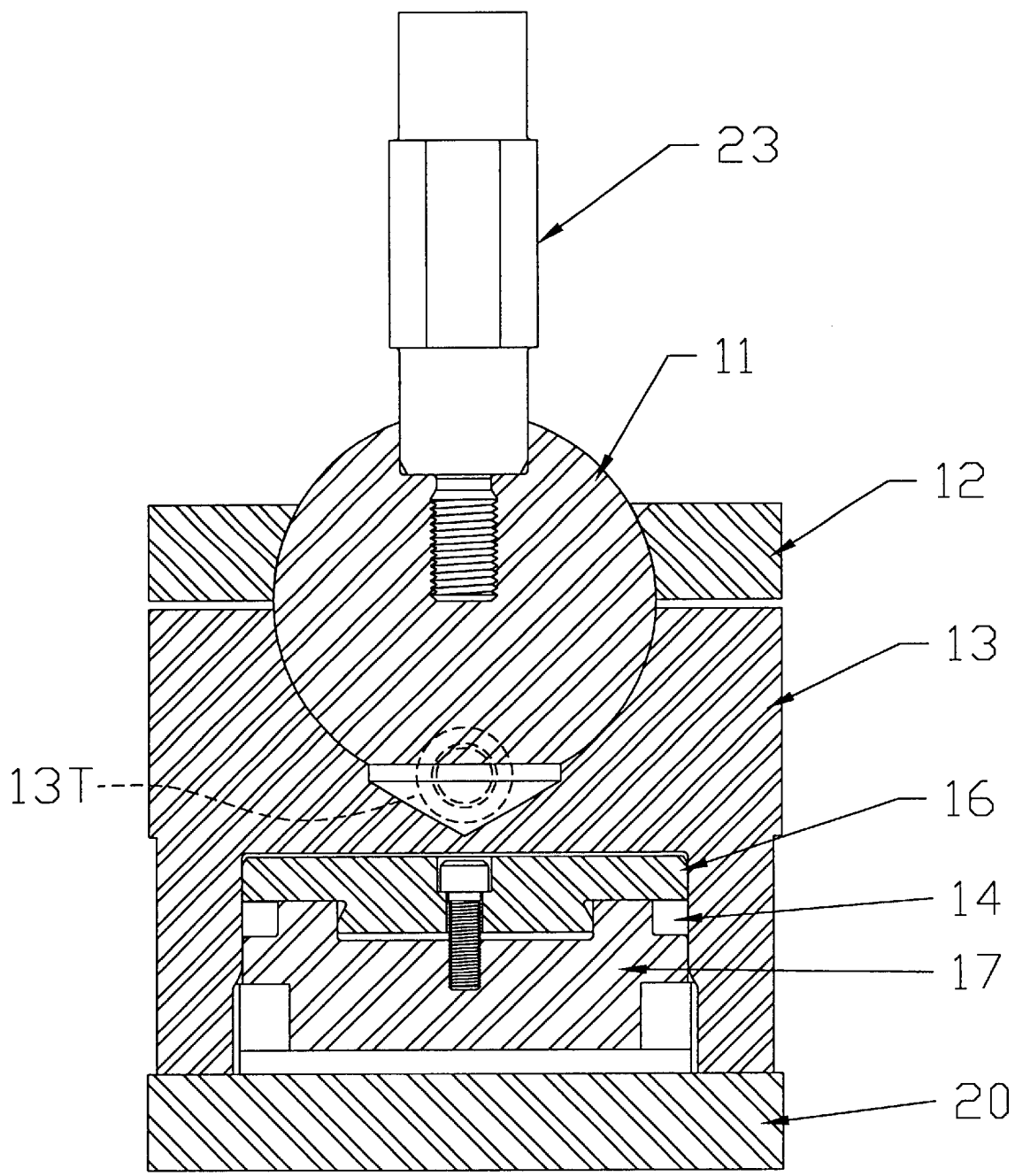
FIG. 5 is a section through taken at line 5—5 in FIG. 1 and viewed in the direction of the arrows.

Referring now to the drawings in detail, the illustrated embodiment includes a ball 11 received in a two-part socket including an upper socket portion in a clamping plate 12, and a lower socket portion in a body 13. The body has a generally cylindrical downwardly-opening cavity 15 extending downward to the bottom edge of the body. A generally-cylindrical piston assembly is received in the cavity and includes the seal retainer cap 16 secured to the piston 17 by a socket head cap screw 18, and capturing a piston seal 14 in the annular groove formed by the circular rib 17R atop the piston, and the underside of the cap 16. The inner edge of the rib 17R forms a recess which centers the seal retainer cap on the piston. As best shown in FIG. 4, the piston 17 is formed with three circularly-spaced arms 17A, each of which has a threaded aperture in it receiving the threaded lower end of a socket head shoulder bolt 21 which serves as a tie rod whose head is received in a recess in the top plate 12.

Figure 6:
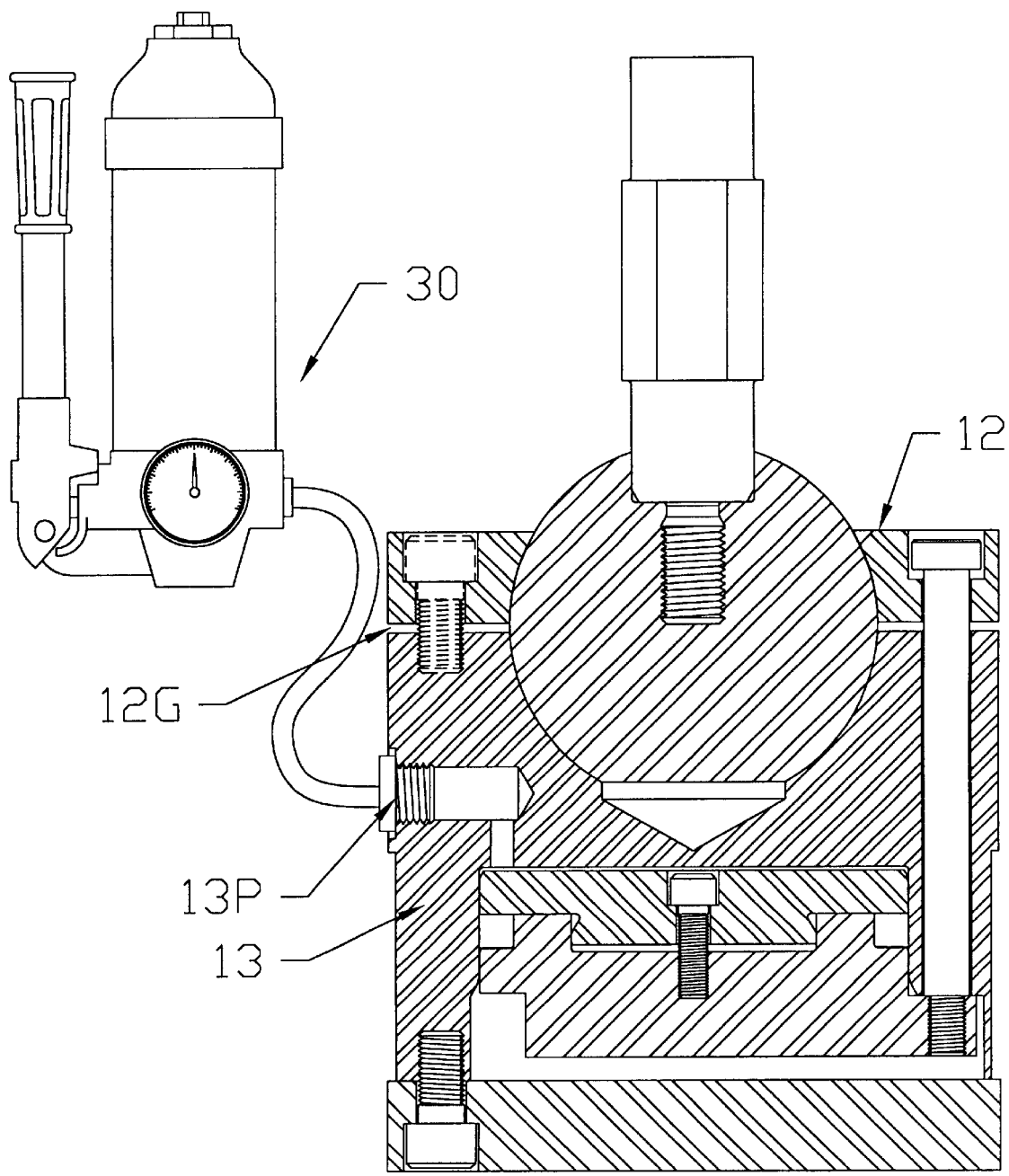
FIG. 6 is a view like FIG. 2 but adding a pump assembly for a self-contained closed system incorporating a locking device according to a typical embodiment of the present invention.

A base 20 is fastened to the bottom of the body by three, circularly-spaced socket-head cap screws 19. Four apertures 25 are provided in the corners of the base for easy attachment to a table or other support. A tapped port 13P is provided in the outer wall of the body 13 and communicates with a internal passageway 13T opening into the chamber portion of cavity 15 above the cap 16. Port 13P is provided to receive a fitting through which pressure can be introduced from an outside source. This is a fluid pressure and may be gaseous or hydraulic, but more likely hydraulic. This pressure may be applied by fluid admitted through a valve in a supply line from a factory pneumatic or hydraulic system (not shown), and released to sump or a return line by the same valve, for example. One of admitted through a valve in a supply line from a factory pneumatic or hydraulic system (not shown), and released to sump or a return line by the same valve, for example. One of several alternatives is shown in FIG. 6. It connects the body 13 to become part of a small, self contained closed hydraulic system with a manually-operated pump assembly 30, including the pump, an accumulator, gauge, and valve to hold pressure, but operable when desired to release pressure from the clamp piston. Such pump assembly is readily available in the art. It can be purchased finished and can be connected to the locking device with a hose as shown, or can be directly connected to the port 13P. An example of such pump assembly is Model No. P-142 manufactured by Enerpac of Butler, Wis.

A maximum possible spacing between the piston cap and the piston is established by the tie rod bolts 21. This spacing is such that there is a gap 12G between the bottom of clamp plate 12 and the top of the body 13 when the ball is resting in and supported by the lower socket, and the plate 12 is resting on and supported by the ball, as shown in the drawings. This gap is typically 0.020 inches. When there is no fluid pressure applied to the chamber above the piston in cavity 15, the piston assembly is suspended in the cavity by whatever friction there may be between the body and the piston and seal assembly. In the absence of pressure in the cavity, the limit to possible descent of the piston assembly is reached when the heads of the tie rods 21 seat on the bottom of their receiver recesses in the plate 12. At this time it is desirable that there be at least a little clearance space between the top of the piston seal retainer cap 16 and the downwardly facing top surface of the piston receiver cavity 15. Therefore, normally the socket portion of plate 12 is not tightly engaged with the ball, so that the ball can be swiveled rather freely, but preferably not loosely, in the lower and upper portions of the socket.

An object support is shown in the form of a post 23 screwed into a hole in the ball so that it is tight in the ball and projects from the ball and away from the body 13. It has an object receiver in the form of a threaded socket 23S at the top, by which an object to be positioned can be fastened with a bolt or a screw. This object can be a work-piece or a tool or another holding or clamping device or about anything that is to be positioned and held in a certain position in space with a certain orientation at that position. The object receiver can be a variety of devices other than a threaded socket. Also, the object support can be other than a solid post. end of the post to the position desired for the object to be treated or used, whether the object is mounted directly to the post or to a holding device mounted to the post, the user can then apply pressure to the pressure port 13P by operating a valve on a pressure line or by operating the closed system pressure-applying pump. When the pressure is applied, the piston 17 is driven in a downward direction forcing the tie rod bolts to pull the plate 12 in a downward direction which clamps the upper socket portion onto the ball 11 and thereby clamps the ball into the lower socket portion. The clamping holds and locks the post securely in the selected attitude until the pressure is released. If there is a desire to lock the post in the selected attitude without concern about possible reduction or loss of fluid pressure during the passage of time, three auxiliary clamp screws 22 (typically socket head cap screws) shown dotted in the drawings, can be screwed into the body 13 to the extent that their heads seat on the bottom of their head-receiving recesses in plate 12, pulling the plate 12 toward body 13 and thereby mechanically supplementing the hydraulic clamping of the plate onto the ball and the ball onto the socket in the body 13. This will keep the ball locked, even if the pressure on the piston is released.

Various sizes of devices may be built according to my invention. Ball diameters of 1.75 inches, 3 inches and 5 inches currently seem desirable for most applications. Materials for fasteners are preferably steel. For the ball, post, body and piston, anodized aluminum works. The clamping plate might preferably be hardened steel. For the piston seal, a square cross section of "Teflon" brand material works. A pressure capability of up to 5000 pounds per square inch (psi) seems appropriate. The locking force of the plate on the ball will depend on the pressure applied and the area of the piston. A force of 15000 pounds can be achieved easily. Obviously many other materials and sizes and pressures may be chosen and used depending on the needs of the user.

The location of the post on the ball enables the post to swivel about the combination socket portions in a 360 degree circle and to rotate 360 degrees about any radius line from the center of the combination socket portions. The center of the ball is at the center of the socket portions when the ball is clamped. Even when the pressure is released from the piston, the ball continues to rest in the lower socket portion, and the upper socket portion will usually remain centered on the ball, so the center of the socket portions remains effectively the center of the ball. The user can move the object-fastening portion of the post in a conical space definable by a radial line from the center of the ball to the object-fastening portion of the post. When the user does this, the post can also be rotated about the radial line to thereby achieve not only the desired position of an attached object in space, but also the desired attitude of the object when in that position. It should be recognized that the means for mounting the object is not necessarily a post, as shown, or a straight member. Also, the apex angle of the conical volume which can be swept during swiveling will depend upon the size and shape of the opening in the top of the plate through which the object mount extends, and the size and shape of the object mount itself where it extends through the opening.

Figure 2:
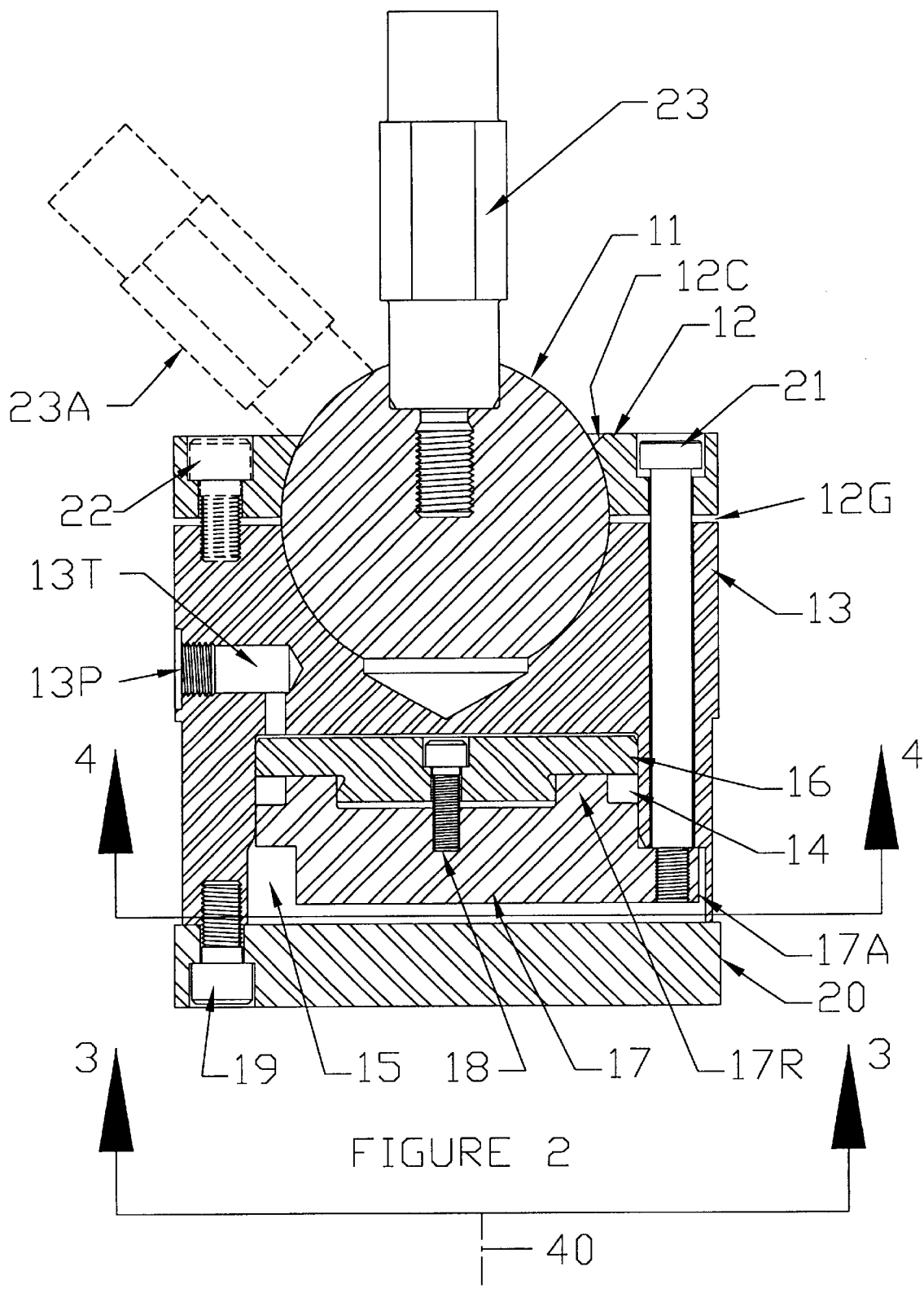
FIG. 2 is a section therethrough taken at line 2—2 in FIG. 1 and viewed in the direction of the arrows.
Figure 2A:
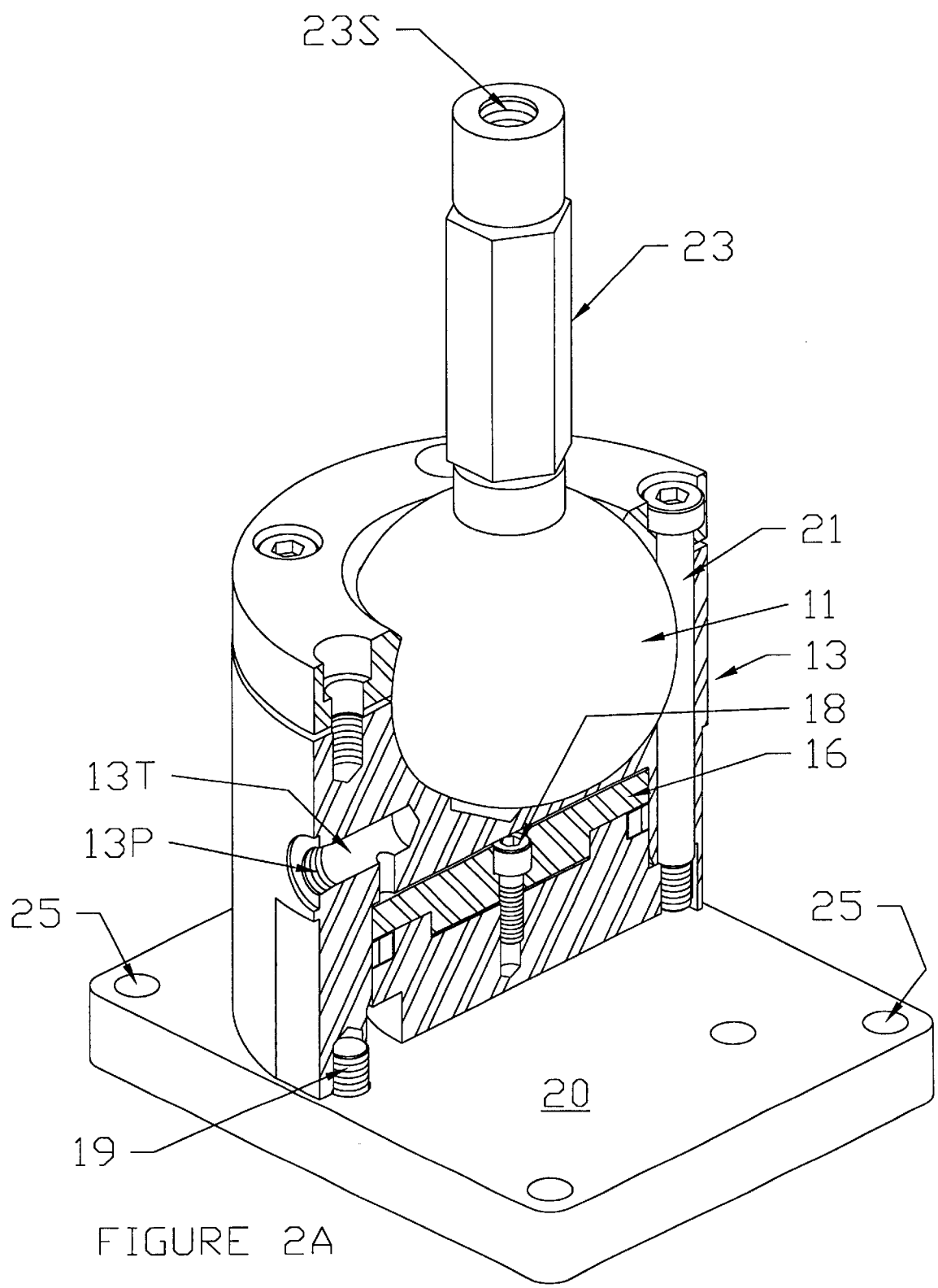
FIG. 2A is an orthographic cut-away section of the device portion above the base and taken at line 2—2 in FIG. 1 and viewed in the direction of the arrows.
Figure 3:
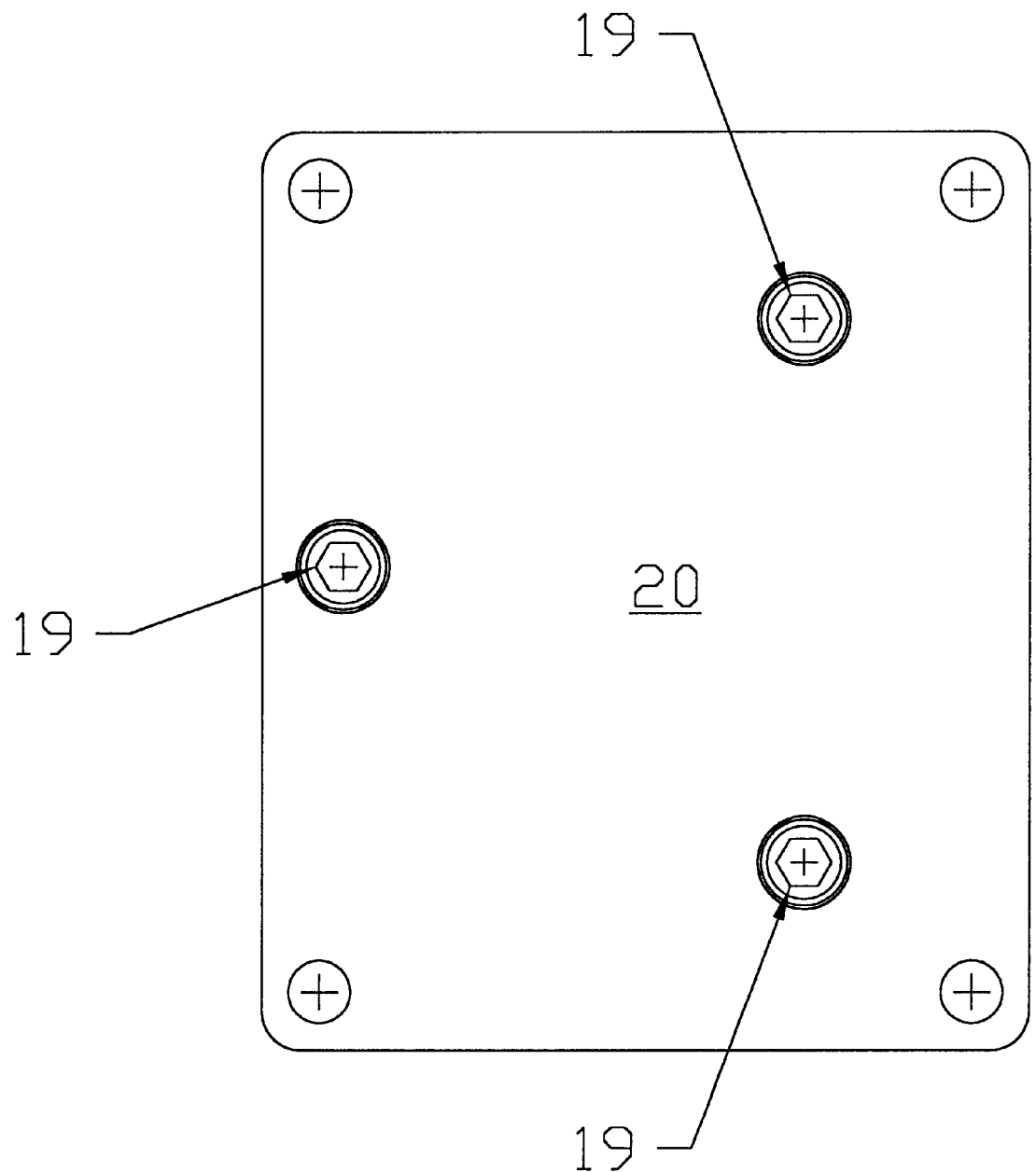
FIG. 3 is a bottom plan view of the device.

In the illustrated example where the opening 12C in plate 12 is round, and the post version of an object mount has a round portion at the opening, the sizes are selected so that the apex angle of the cone is a total of 90 degrees. The dotted line 23A in FIG. 2 is an example of the limit of travel to the left side of the cone at 45 degrees from the vertical center line 40 of the assembly. A larger size opening 12C, or a lesser diameter of the post at the opening, would enable a wider apex angle of the possible sweep of the post.

In view of the foregoing, and while the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A device for holding an object at a selected position and orientation and comprising:

a ball;

a body having a first part-spherical socket portion having a center of curvature and fittingly receiving said ball;

a cavity in the body, said cavity having a cylindrical wall, the wall having a cylindrical axis on a line extending through the said center of curvature, with the cavity opening in a direction away from the socket portion;

a piston received in the cylindrical wall of the body and co-operating with the cavity to form a chamber in the body;

the piston being slidably received in the chamber and moveable in a direction toward and, alternatively, away from the socket;

a socket cover having a second part-spherical socket portion facing toward the first part-spherical socket portion and receiving the ball therein;

ties connected to the cover and to the piston to prevent the spacing between the cover and the piston from exceeding a predetermined limit;

a passageway in the body and communicating with the chamber for pressurized fluid to enter the chamber to cause the piston to move in the direction away from the socket portions and thereby cause the cover to clamp tightly against the ball and lock the ball in a selected orientation; and a projection on the ball and adapted to connect to the said object to be positioned and held.

2. The device of claim 1 and wherein:

said projection is a post on the ball and which extends in a direction away from the socket portions and has means thereon for attachment of said object to the post.

3. The device of claim 2 and wherein:

the means for attachment is a screw thread at the distal end of the post.

4. The device of claim 1 and further comprising:

a base attached to said body and securable to a stationary support.

5. The device of claim 1 and further comprising:

a pressurized fluid source coupled to said passageway and operable to apply fluid pressure to said chamber to lock said ball, and to selectively enable reduction of fluid pressure from said passageway to enable unlocking of said ball.

6. The device of claim 5 and further comprising:

fasteners on said body in position for clamping said cover to said ball.

7. The device of claim 6 and wherein:

said fasteners are screws threaded into said body and having heads received in recesses in said cover.

8. An object holding device comprising:

a body having a first part-spherical socket portion for fittingly receiving a ball;

a member having first and second convex face portions, said first face portion being received in said first part-spherical socket portion;

a clamp having a portion engaging said second convex face portion;

an object mount on the member and extending in a direction away from the socket portions and from the body for attachment of an object to the member;

a cylinder in the body;

a piston cooperating with the cylinder to form a chamber in the body, the piston being connected to the clamp by ties so that when pressurized fluid is applied to the chamber, the piston moves the engaging clamp portion tight against the second convex face portion, locking the member in the socket portions; and fasteners connected to said body and positioned to engage said clamp, and operable when applied to said clamp to lock said clamp to said member.

9. An object holding device comprising:

a body having a first part-spherical socket portion for fittingly receiving a ball;

a member having first and second convex face portions, said first face portion being received in said first part-spherical socket portion;

a clamp having a portion engaging said second convex face portion;

an object mount on the member and extending in a direction away from the socket portions and from the body for attachment of an object to the member;

a cylinder in the body;

a piston cooperating with the cylinder to form a chamber in the body, the piston being connected to the clamp by ties so that when pressurized fluid is applied to the chamber, the piston moves the engaging clamp portion tight against the second convex face portion, locking the member in the socket portions; and wherein said ties are bolts having threads received in said piston.

10. The device of claim 9 wherein:

said piston is cylindrical and has a plurality of arms circularly spaced about the cylindrical axis of said piston and having said threads therein.

11. The device of claim 10 and wherein:

said body and said clamp have holes therein receiving said bolts through said holes.

* * * * *